United States Patent [19]

Schalch

[11] 4,137,444
[45] Jan. 30, 1979

[54] WIRE RESISTANCE-ROLL WELDER WITH BRAKE AND TENSION DEVICES

[75] Inventor: Fred Schalch, Le Landeron, Switzerland

[73] Assignee: Fael S.A., Saint-Blaise, Switzerland

[21] Appl. No.: 846,633

[22] Filed: Oct. 31, 1977

[30] Foreign Application Priority Data

Nov. 10, 1976 [CH] Switzerland ............... 14144/76

[51] Int. Cl.² ............................................ B23K 11/06
[52] U.S. Cl. .................................... 219/81; 219/84
[58] Field of Search ................ 219/81, 82, 83, 84, 219/64, 119

[56] References Cited

U.S. PATENT DOCUMENTS

| 3,102,945 | 9/1963 | Opprecht | 219/81 |
| 3,430,027 | 2/1969 | Denis | 219/81 |
| 3,745,295 | 7/1973 | Opprecht | 219/64 |

Primary Examiner—E. A. Goldberg
Attorney, Agent, or Firm—Charles E. Brown

[57] ABSTRACT

An electrical resistance-roll seam welding machine having a pair of welding rolls or rollers and at least one electrode wire which is guided from a supply station for the infeed of fresh welding wire by means of at least one of the welding rolls to a collecting station or location for used or consumed wire. The electrode wire can be brought into contact by means of the welding rolls with the workpiece which is to be welded. A brake device is arranged between the supply station and the welding rolls and a tension device for the electrode wire is disposed between the welding rolls and the collecting station or location. The sum of the tension force exerted by the tension device upon the wire and the brake force exerted by the brake device upon the wire is great enough in order to continuously maintain in tensioned state the electrode wire through its path of travel between the brake device and the tension device. At least one of the welding rolls is operatively coupled with a drive device which imparts to the electrode wire which is guided by means of said one welding roll a speed of travel coinciding with the desired feed speed of the workpieces during the formation of the welding seam. The difference between the tension force exerted by the tension device upon the wire and the brake force exerted by the brake device upon the wire is smaller than the entrainment force exerted by the periphery of said one welding roll upon the electrode wire.

4 Claims, 5 Drawing Figures

WIRE RESISTANCE-ROLL WELDER WITH BRAKE AND TENSION DEVICES

BACKGROUND OF THE INVENTION

The present invention relates to a new and improved construction of an electrical resistance-roll seam welding machine, sometimes also referred to in the art as a resistance roll-welding machine or apparatus.

The resistance roll-welding machine of the invention is of the type comprising a pair of welding rolls and at least one electrode wire which is guided from a supply station or location for fresh wire by means of at least one of the welding rolls to a collecting station or location for consumed wire and the electrode wire can be brought into contact with the workpieces to be welded by means of the welding rolls. The welding machine further contemplates providing for the electrode wire a brake device between the supply station and the welding rolls and a tension or traction device between the welding rolls and the collecting station, the sum of the tension force exerted by means of the tension device upon the wire and the brake force exerted by means of the brake device upon the wire is large enough in order to continuously maintain in a tensioned state the electrode wire along its path of travel between the brake device and the tension device.

With state-of-the-art welding machines of the previously mentioned type the electrode wire is solely placed into movement by means of the tension device, and the wire also must drive the welding rolls and the workpieces passing between the welding rolls during the welding operation. As a result, the electrode wire is exposed to a relatively high tensional stress over its entire length between the brake device and the tension device, which can lead to appreciable elongation of the wire. This in turn can result in difficulties with respect to the synchronization of the wire drive i.e., the welding roll drive and the transport device for bringing the workpieces to be welded to the welding rolls. Hence, it is for these reasons that prior art resistance roll-welding machines of the previously mentioned type possess special means and measures in order to eliminate any deleterious effects of the momentarily arising lengthwise elongation of the electrode wire following termination of each welding operation by freely retightening the wire.

SUMMARY OF THE INVENTION

Therefore, with the foregoing in mind it is a primary object of the present invention to provide an improved construction of resistance roll-welding machine which is not associated with the aforementioned drawbacks and limitations of the prior art proposals.

Another and more specific object of the present invention aims at a new and improved construction of a resistance roll-welding machine of the previously mentioned type which is structured such that there are effectively avoided the previously discussed disadvantages and there can be dispensed with the need for any means for the free retightening of the wire following each welding operation.

Yet a further significant object of the present invention aims at the provision of a new and improved construction of resistance roll-seam welding machine which is relatively simple in construction and design, extremely reliable in operation, not readily subject to breakdown or malfunction, requires a minimum of maintenance and servicing, and incorporates structure providing for controlled movement of the electrode wire and the forces applied thereto.

Now in order to implement these and still further objects of the invention, which will become more readily apparent as the description proceeds, the resistance roll-welding machine of the present development is manifested by the features that at least one of the welding rolls is operatively coupled with a drive device which serves to impart to the electrode wire guided over the aforesaid one welding roll a speed of travel which coincides with the desired feed speed of the workpieces during the formation of the welding seam, and the difference between the tension force exerted by means of the tension device upon the wire and the brake force exerted by means of the brake device upon the wire is smaller than the entrainment force exerted by the periphery of the welding roll upon the electrode wire.

With this construction of the resistance roll-welding machine of the present invention the welding speed is fixed by directly driving one of the welding rolls independent of any possibly occuring elongation of the electrode wire. The tension or traction device at the end of the path of travel of the wire only has the function to insure that there is present a sufficient tension in the wire, so that it does not become slack, and to positively draw away the wire portions which are consumed and travel away from the driven electrode roll and to convey such to the collecting location or station.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1B:
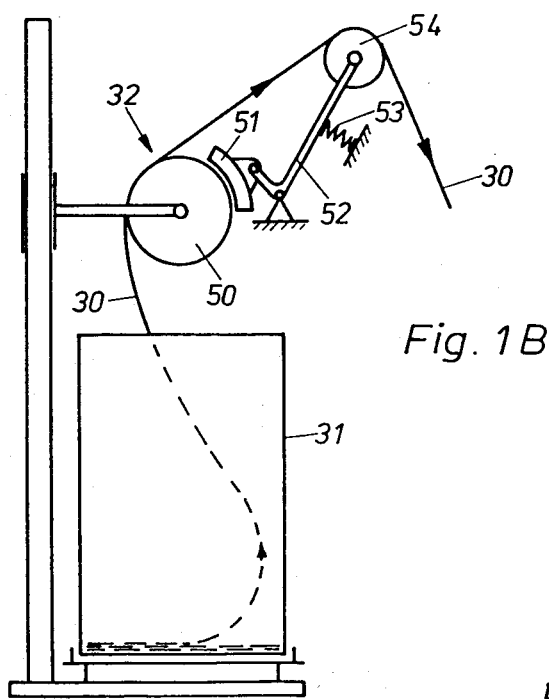
FIGS. 1A, 1B and 1C are respective side views illustrating different components of a roll seam-welding machine constructed according to the teachings of the present invention, there having been conveniently only illustrated those parts which are of importance for explaining the underlying concepts of the invention, whereas the remaining parts of the welding machine have been conveniently omitted from the showing of the drawings to simplify the illustration thereof.
Figure 1A:
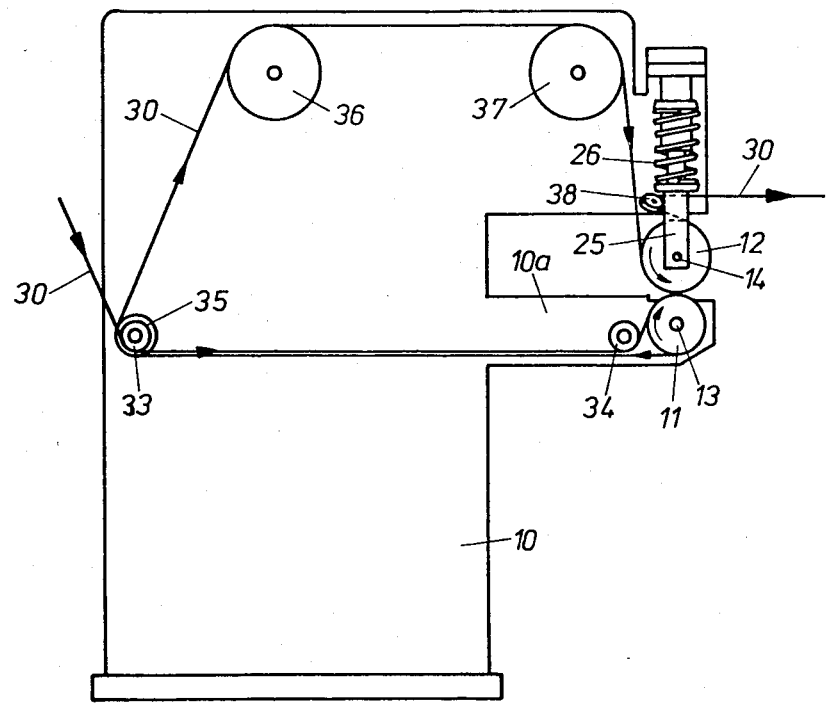
Figure 2:
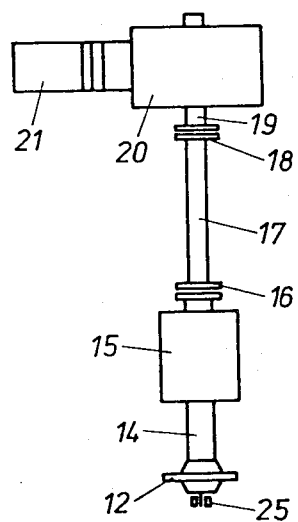
FIG. 2 is a top plan view of a part of the components of the welding machine illustrated in FIG. 1A.

Describing now the drawings, it is to be appreciated that only enough of the structure of the resistance roll-welding machine of this invention has been shown in order to enable one skilled in the art to readily understand the underlying principles and concepts of the invention and to simplify the illustration of the drawings. Turning attention to FIG. 1A, reference characters 11 and 12 designate a lower and an upper welding roll, respectively, defined by roller electrodes — these welding rolls also being referred to in the art as electrode rolls or rollers. Between the lower welding roll 11 and the upper welding roll 12 there travel the workpiece parts which are to be welded to one another, for instance cylindrically rolled can shells or jackets. The lower welding roll 11 is freely rotatably mounted by means of a stationary shaft 13 at an arm 10a of the machine frame 10. The upper welding roll 12 on the other hand is fixedly seated upon a shaft 14, which according to the showing of FIG. 2 is rotatably mounted in a bearing housing 15 disposed at an axial spacing laterally of the welding roll 12. The end of the shaft 14 which faces away from the welding roll 12 is operatively connected by means of a flexible coupling 16 with an intermediate shaft 17, which, in turn, is coupled by means of a flexible coupling 18 with the power take-off shaft 19 of a transmission or gearing 20. Flanged to the gearing or transmission 20 is an electrical drive motor 21 serving to drive the welding roll 12. The rotational speed of the welding roll 12 can be infinitely varied within wide limits. The end of the shaft 14 carrying the welding roll 12 is movably guided in vertical direction by means of a guide bearing 25. According to the showing of FIG. 1A a spring 26 or equivalent structure downwardly presses the guide bearing 25, in order to press the upper welding roll 12 against the lower welding roll 11 and to produce the necessary welding pressure. This movement of the shaft 14 is possible for any random rotational position of such shaft 14 by virtue of the provision of the flexible couplings 16 and 18. In conventional manner a low-voltage winding of a not particularly illustrated welding transformer is connected both with the machine frame 10 and with the bearing housing 15 which is electrically insulated from the machine frame 10. The flexible couplings 16 and 18 are electrically insulated, so that also the shaft 14 and the upper welding roll 12 are electrically insulated from the machine frame 10. The rotary or pivot bearings between the shaft 13 and the lower welding roll 11 and between the bearing housing 15 and the shaft 14 are constructed to transmit the welding current from the stationary to the rotatable part and vice versa.

In order to prevent a coating of the welding rolls 11 and 12 with molten tin when welding workpiece blanks or parts formed of tin plate, an electrode wire 30 formed of a good electrically conducting material, such as for instance copper, is guided in conventional manner over a part of the periphery of each welding roll 11 and 12, so that the tin of the surface of the tin plate and which melts during the welding operation does not adhere to the welding roll, rather at the electrode wire 30 and is transported away therewith. As best seen by referring to FIG. 1B, the electrode wire 30 is withdrawn from a supply container 31 constituting a supply station or location for fresh or unconsumed electrode wire, then is guided by means of a brake device 32 and guide and deflecting rolls 33 and 34, which are rotatably mounted at the machine frame 10 (FIG. 1A), to the lower welding roll 11. After looping about the lower welding roll 11 the electrode wire 30 travels over further guide and deflecting rolls 35, 36 and 37, rotatably mounted at the machine frame 10, to the upper welding roll 12 about which there is likewise looped or wrapped the electrode wire 30. Thereafter, the electrode wire 30 arrives by means of an inclined positioned guide and deflecting roll 38 at a tension or traction device 40, illustrated in detail in FIG. 1C, which delivers the wire to a chopper 41 or equivalent structure. The pieces of the electrode wire which are thus cut by the chopper 41 are collected in a collecting container 42 defining a collecting station or location for consumed wire. The course of travel of the electrode wire 30 has been indicated in FIGS. 1A, 1B and 1C by not particularly referenced arrows.

The already mentioned brake device 32 (FIG. 1B) will be seen to comprise a rotatably mounted drum 50 about which there is wrapped a number of times the electrode wire 30. Cooperating with the drum 50 is a brake shoe 51 mounted at a pivotable lever 52. This pivotable lever 52 is exposed to the action of a spring 53 or other suitable resilient means, which strives to press the brake shoe 51 against the drum 50. Furthermore, there is rotatably mounted at the lever 52 a so-called dancer roll 50 over which travels the electrode wire 30. The arrangement is carried out in such a fashion that due to the tension of the electrode wire upon the lever 52 there is exerted a rotational moment which is opposite to the action of the spring 53. With increasing tensional stress in the electrode wire 30 the pressure of the brake shoe 51 upon the drum 50 diminishes.

Figure 1C:
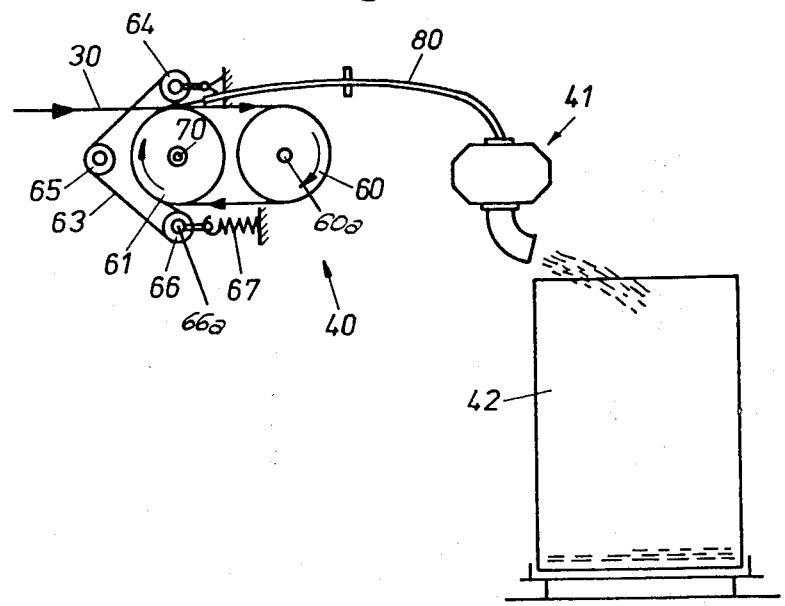
Figure 3:
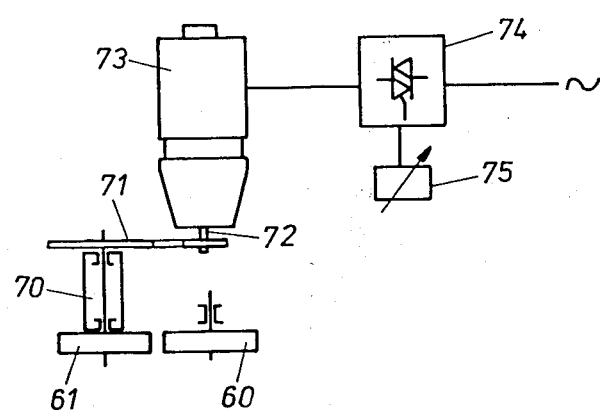
FIG. 3 is a top plan view, analogous to the showing of FIG. 2, of a part of the components of the welding machine shown in FIG. 1C.

As best seen by referring to FIG. 1C, the tension or traction device 40 comprises two drums 60 and 61 which are arranged adjacent one another such that their shafts 60a and 70 are essentially in parallelism to one another. The electrode wire 30 is wrapped a number of times alternately about one-half of the periphery or circumference of the roll 60 and about one-half of the periphery or circumference of the roll 61. By means of an endless band 63, which is guided over three deflection or deflecting rolls 64, 65 and 66, the wire windings or coils are pressed against the periphery of the drum 61. The shaft 66a of the roll 66 is exposed to the action of a spring 67 which tensions the endless band 63 and maintains a run thereof continuously in contact with the periphery of the drum 61. Whereas the one drum 60 is freely rotatable, the other drum 61 is secured to shaft 70 which, according to the showing of FIG. 3, is in driving connection by means of a chain drive 71 with the shaft 72 of an electrical drive motor 73. The motor 73 is an asynchronous motor which is powered by an electrical control device 74 from an alternating-current power distribution network. The control device 74 has conventional circuitry for the phase control, and the ignition point can be adjusted within each alternating-current voltage half wave by means of an adjustment element 75, in order to be able to control the torque or rotational moment produced by the asynchronous motor 73. After the electrode wire 30 has moved past the tension device 40 such electrode wire is pushed into a guide tube 80 (FIG. 1C), by means of which such wire is fed to the previously mentioned chopper or wire comminution device 41.

By means of the tension device 40 (FIG. 1C) there is exerted upon the electrode wire 30 a tensional stress or tension, whereas at the same time the brake device 32 (FIG. 1B) exerts a brake or braking force upon such wire. The sum of the tension force and the brake force must be sufficiently great in order to maintain the electrode wire 30 tensioned during its travel from the brake device 32 to the tension device 40. On the other hand, the tension force exerted by the tension device 40 upon the electrode wire 30 is not so great that it would be adequate to pull such electrode wire 30 through the welding machine. It is possible to adjust the tension force of the tension device 40 and the brake force of the brake device 32 to be either approximately of the same or exactly of the same magnitude. In each case the difference of the tension force produced by the tension device 40 and the brake force exerted by the brake device 32 is smaller than the entrainment force exerted by friction by the driven welding roll 12 upon the electrode wire 30. Consequently, the feed movement of the electrode wire 30 is exclusively determined by the rotational speed of the driven welding roll 12. The tension device 40 merely transports the electrode wire which travels off of the welding roll 12 to the chopper 41 and to the collecting container or station 42 for the consumed wire.

With the aid of the control device 74 and the adjustment element 75 there can be varied and controlled the torque exerted by the motor 73 and thus also the tension force exerted by the tension device 40 upon the electrode wire 30 (FIG. 3). The tension force therefore can be optimumly adjusted to the momentarily encountered operating conditions of the welding machine, such as for instance welding speed, quality of the electrode wire and so forth. Also the base adjustment of the brake device 32 is appropriately effected by adjusting the spring 53 (FIG. 1B). Furthermore, by means of the dancer roll 54 and the lever 52 there is achieved the beneficial result that during operation the brake force exerted by the brake device upon the electrode wire is automatically maintained at least approximately constant.

The described manner of guiding the electrode wire and the wire drive affords essentially the following advantages: the tensional stresses or tensional forces which are present in the electrode wire 30 are in toto smaller than those prevailing for the equipment of the state-of-the-art where the wire exclusively is pulled by a tension device (instead of the tension device 40) through the entire welding machine. The feed movement of the electrode wire 30 is exclusively determined by the driven welding roll 12, the peripheral speed of which also governs the welding speed. The welding speed therefore cannot be influenced by the tension forces and brake forces exerted upon the electrode wire. Therefore, surge-like or intermittent tension fluctuations possibly exerted by the dancer roll 54 upon the wire have practically no effect upon the welding speed. Finally, it is also advantageous that the means provided for the wire drive are exposed to only a relatively small influence of the mass.

While there are shown and described present preferred embodiments of the invention, it is to be distinctly understood that the invention is not limited thereto, but may be otherwise variously embodied and practiced with the scope of the following claims.

Accordingly, what I claim is:

1. An electrical resistance-roll seam welding machine for welding a workpiece, comprising:

a pair of welding rolls;

supply means defining a supply station for fresh welding wire for infeeding at least one electrode wire;

means providing a collecting station for consumed welding wire;

said supply means delivering the electrode wire by means of at least one of the welding rolls to said collecting station;

said welding rolls forming means for placing the welding wire into contact with a workpiece to be welded;

a brake device for the electrode wire arranged between the supply station and the welding rolls;

a tension device for the electrode wire arranged between the welding rolls and the collecting station;

the sum of the tension force exerted by the tension device upon the wire and the brake force exerted by the brake device upon the wire being large enough to continuously tension the electrode wire as it moves along its path of travel between the brake device and the tension device;

drive means operatively coupled with at least said one welding roll over which there is guided the electrode wire;

said drive means imparting by means of said one welding roll over which the electrode wire is guided a speed of travel to said electrode wire which corresponds to the desired feed speed of the workpieces during formation of the welding seam; and the difference between the tension force exerted by the tension device upon the electrode wire and the brake force exerted by the brake device upon the electrode wire being smaller than the environment force exerted upon the electrode wire by the periphery of said one welding roll.

2. The welding machine as defined in claim 1, wherein:

said tension device comprises at least one drum about which there is trained said electrode wire; and an electrical asynchronous motor for driving said drum with a variable and adjustable torque.

3. The welding machine as defined in claim 1, wherein:

said brake device comprises a drum about which is wrapped said electrode wire;

a brake for exerting a brake moment upon said drum;

a dancer roll;

a pivotable arm carrying said dancer roll;

said electrode wire, after traveling off of said drum, being guided by said dancer roll;

means for operatively connecting said pivotable arm with said brake;

a spring acting upon said pivotable arm;

said pivotable arm being pivotable under the influence of said spring and the tension force transmitted from the electrode wire by means of the dancer roll in such a manner that the brake force exerted by the brake device upon the electrode wire remains at least approximately constant.

4. The welding machine of claim 1 wherein the difference between the tension force and the brake force is insufficient to effect feeding of the electrode wire in the absence of said one welding roll.

* * * * *